May 23, 1961     D. W. LUKS     2,985,547
METHOD FOR PREPARING COATED BODIES
Filed June 13, 1958
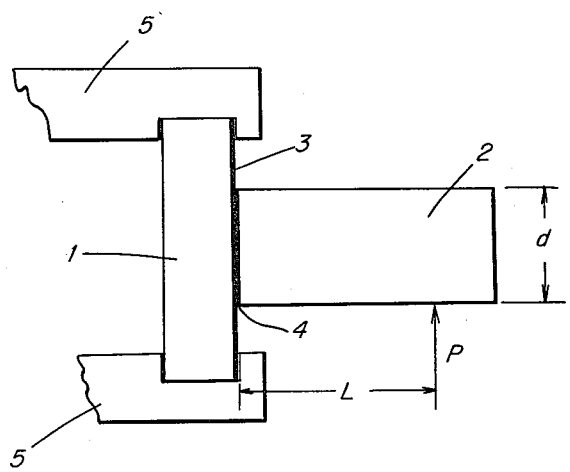
Inventor
Daniel W. Luks
By his attorneys
Howson and Howson

2,985,547
METHOD FOR PREPARING COATED BODIES

Daniel W. Luks, Frenchtown, N.J., assignor to Frenchtown Porcelain Company, Trenton, N.J., a corporation of New Jersey Filed June 13, 1958, Ser. No. 741,903

7 Claims. (Cl. 117—160)

This invention relates to coated non-metallic refractory bodies, to compositions for coating such bodies and to methods for preparing such compositions.

In many industries it is necessary to join a refractory non-metallic body, such as a ceramic or glass body, to a metal body with a firm and, in many cases, vacuum-tight seal. To make such connections the non-metallic body is customarily covered with a metallic coating to which the object may be joined by soldering with either hard solder or soft solder. Many suggestions have been made for compositions whereby such metallic finishes can be applied to refractory non-metallic bodies.

In the copending application, Serial No. 448,502, filed August 9, 1954, now Patent No. 2,857,664, of Daniel W. Luks and John Powell, a coating composition is described which is suitable for applying a metallizing coating to non-metallic refractory bodies, which can be joined to metals or to other bodies similarly coated by means of either hard or soft solder. The coating described in said copending application comprises a vehicle and a metallic-glass base. The base consists essentially of about 5 to about 30% of a powdered refractory metal, selected from the group consisting of molybdenum and tungsten, from about 40 to about 85% of a powdered heavy metal selected from the group consisting of nickel, cobalt and iron, a powdered manganese constituent in a proportion, calculated as elemental manganese, not exceeding about 35% by weight and from about 5 to about 30% powdered glass.

Again in my copending application, Serial No. 506,416, filed May 6, 1955, now Patent No. 2,848,802, other compositions are disclosed which are especially adaptable for soft soldering. According to said Patent No. 2,848,802, such composition comprises a vehicle and metallic-glass base, said metallic-glass base consisting essentially of between about 60% and about 94.5% by weight of a heavy metal selected from the group consisting of nickel, cobalt and iron, between about 0.5% and about 30% by weight, calculated as $MnO_2$, of a manganese constituent, and between about 5% and about 30% by weight glass.

In the technique described in said applications, the compositions are prepared by adding the heavy metal or the mixture of heavy and refractory metals, the powdered manganese constituent, and the powdered glass constituent separately to the vehicle, with or without a binder, and agitating the mixture until a homogeneous dispersion is achieved. The mixture can then be applied to a refractory non-metallic body and the coated body fired in an inert atmosphere. The fired body is cooled in the inert atmosphere. It is then ready to be joined to a metal body or to another non-metallic refractory body by hard or soft solder as the case may be.

It has now been found that superior bonds can be obtained in the final soldered product whether the compositions of Patent No. 2,857,664 or of Patent No. 2,848,802 are employed, if the manganese constituent is first formed into a frit with the glass component, and added to the coating compositions as a powdered frit.

The invention therefore comprises a method for preparing a coating composition for refractory non-metallic bodies consisting essentially of a vehicle, and a metallic-glass base, said metallic-glass base consisting essentially of a metallic component selected from the group consisting of at least one heavy metal selected from the group consisting of nickel, cobalt and iron and mixtures of such heavy metal with at least one refractory metal selected from the group consisting of molybdenum and tungsten, a manganese constituent and a glass, which comprises forming a frit of said manganese constituent and said glass, powdering said frit and mixing said frit with said metallic component and said vehicle.

The method is preferably used with compositions in which the metallic-glass base consists essentially of 45–95% of the metallic component and about 5–55% of the glass, the glass itself containing as a dissolved ingredient 0.5–25% on the weight of the metallic glass base of manganese. When a mixture of heavy metal and refractory metal is used, the heavy metal should preferably constitute between about 40% and about 85% of the metallic-glass base and the refractory metal preferably between about 5 and about 30% of the metallic-glass base. When the heavy metal is used without a refractory metal, it should constitute preferably between about 60% and about 95% of the metallic-glass base.

The invention further includes a method of making a coated metallic body which comprises preparing a composition in the manner described above, applying it to a non-metallic refractory body and firing the coated body.

In preparing the composition the heavy and refractory metals should be present in their elemental state.

Of the three heavy metals, nickel is preferred, with cobalt the second choice. Molybdenum is the refractory metal of choice.

In making up the manganese glass frit, manganese may be added to the glass in any convenient form, as elemental manganese or as compounds of manganese such as the dioxide ($MnO_2$), manganese tetraborate $$(MnB_4O_7)$$

manganese carbonate ($MnCO_3$), manganese dichloride ($MnCl_2 \cdot 4H_2O$), manganese hydroxide ($Mn(OH)_2$), manganese pyrophosphate ($MnP_2O_7$), manganese sulphate ($MnSO_4$), and potassium permanganate ($KMnO_4$). In general it is more convenient to add the manganese as $MnO_2$.

Many different types of glasses may be used in the present compositions. In general the glass should be water insoluble and should be selected to match the coefficient of thermal expansion of the ceramic to which it is applied. The glass should form a flux with the manganese within the firing range between about 1300° F. and about 2400° F.

Glasses having these properties are readily compounded by those skilled in the art from mixtures of silica ($SiO_2$) and various combinations of the oxides of aluminum ($Al_2O_3$), boron ($B_2O_3$), sodium ($Na_2O$), potassium ($K_2O$), lithium ($Li_2O$), calcium ($CaO$), magnesium ($MgO$), barium ($BaO$), lead ($PbO$), and zinc ($ZnO$), among other elements. Some suitable glasses are listed below:

Table I
GLASS COMPOSITION

|  | A | B | C | D | E |
|---|---|---|---|---|---|
| Potassium Oxide | 5.9 | 3.1 | | 6.1 | 11.9 |
| Sodium Oxide | 5.9 | 7.2 | | 1.1 | 2.1 |
| Calcium Oxide | 8.1 | | | 10.9 | |
| Aluminum Oxide | 9.5 | 16.5 | 5.3 | 14.3 | 21.0 |
| Boron Oxide | 21.5 | 31.8 | | | |
| Silicon Oxide | 49.1 | 41.4 | 41.6 | 67.6 | 65.0 |
| Barium Oxide | | | 53.1 | | |

In addition to the metallic-glass base the composition may also comprise a liquid vehicle to enable it to be applied to a body. The vehicle should be chosen so that it becomes completely vaporized at the firing temperature. It should not leave a residue after firing, nor should it react with the metallic or glass components of the coating composition either under room conditions or at firing temperature. The liquid vehicle may be water. Examples of other suitable vehicles are benzene, the esters of fatty acids and alcohols of low molecular weight, such as ethyl, butyl and amyl acetate, ketones such as acetone and methylethyl ketone (butanone) and higher ethers, such as glycol diethyl ether and diethyl Carbitol. Of these, amyl acetate or acetone are preferred.

The composition may also include a binder. Like the vehicle the binder should be chosen to be completely vaporized at the firing temperature without leaving a residue. Like the vehicle it should not react with the other components of the composition under room conditions or at firing temperature. Examples of suitable binders are methyl methacrylate, and cellulose esters and esters such as cellulose nitrate, cellulose acetate, cellulose butyrate, methyl cellulose and ethyl cellulose. Of these, cellulose nitrate or acetate is preferred.

Between about 25% and about 50%, preferably between about 30 and about 35% vehicle are used based on the weight of the entire composition. Binder, when present, is used in proportions between about 0.25% and about 3%, preferably between about 1% and about 15% on the weight of the entire composition.

In preparing the composition, a glass melt is preferably first prepared, either by melting the individual constituents of the glass or by melting glass which has already been prepared. To the molten glass the required quantity of elemental manganese or manganese compound is added. When the manganese constituent has thoroughly dissolved in the glass the melt is cooled either by pouring into water or onto a plate. The cooled glass is then further reduced in size by grinding, as for example in a ball mill, to a particle size not greater than about 8 microns, preferably between about 1 and about 4 microns.

The metallic component or components are also reduced to powdered form of about the same particle size.

The powdered manganese-glass constituent and the powdered metal or metals are then added with agitation to the vehicle or to a solution of a binder in the vehicle. Agitation is continued until a uniform suspension is obtained. The term "suspension" is used to indicate that the solid particles of glass and metal are uniformly distributed throughout the vehicle, but are not dissolved. A true colloidal suspension may be obtained, but is not necessary.

The suspension so prepared may be applied to refractory non-metallic bodies by brushing, dipping or spraying or by any other convenient means.

The term "refractory non-metallic body" is used in the present application to mean a body made of a material other than metal which will not melt, decompose, or change its shape or composition under the firing temperatures involved in forming the coatings described, i.e., 1400° F. to 2400° F.

The refractory non-metallic bodies suitable for use in the present invention may be of glass, such as pyrex chemical ware, of ceramics such as porcelain, stoneware, and whiteware, of substances commonly referred to as simply "refractories," such as graphite, cordierite, steatite, silicon carbide, or alumina, or of fire brick of various types such as silica, chrome or magnesite brick. Ceramic materials may or may not be glazed before the coating is applied.

The body having been coated is placed in a suitable firing device, such as an oven, in a reducing atmosphere, and fired.

The firing temperature and time will vary with the precise composition of the coating, since there is an optimum firing temperature for each composition at which the best combination of solder wettability and bond strength are obtained. In general, the article will be fired at a temperature between about 1300° F. and about 2400° F. preferably between about 1400° F. and about 2100° F. for a period of between about 15 minutes and about two hours. By using a reducing atmosphere, for example, an atmosphere containing say about 15% hydrogen and about 85% nitrogen, any undesirable oxidizing impurities are removed.

After firing, the coated body is cooled in a non-oxidizing protective atmosphere, after which it may be joined to metal objects or to other refractory non-metallic objects which have been similarly treated, by hard or soft soldering, as is appropriate to the particular composition.

The following examples illustrate the invention but are not to be taken as limiting the invention beyond the scope of the appended claims. Proportions given in the examples are parts by weight.

The drawing shows the bodies used in testing the strength of coating obtained with the new compositions, as referred to in the examples.

EXAMPLE I

A glass having the composition listed in column A in Table I, was melted at a temperature of 1550° F. To 70 parts of this was added 30 parts of manganese dioxide ($MnO_2$), the manganese dioxide being dissolved in the molten glass. The mixture was then poured into water at room temperature. The resulting glass particles were ground in a ball mill to a particle size between about 1 and about 8 microns.

To 26 parts of the powdered manganese-containing glass was added 74 parts of powdered nickel. The mixture was then further ball milled for about 24 hours until the powdered materials were thoroughly dispersed. A water paste was then made up and applied to an unglazed 79% aluminum porcelain insulator. The body so coated was placed in a muffle furnace whose temperature was about 1760° F. An atmosphere consisting of 15% $H_2$ and 85% $N_2$ was maintained in the furnace. After about 30 minutes the insulator reached firing temperature. It was soaked for about 30 minutes and then allowed to cool at room temperature in a protective atmosphere of hydrogen and nitrogen. It had a uniform metallic coating light grey in color. A copper wire was soldered to the coated insulator with soft solder using a soldering iron. The solder wetted easily and a firm bond was formed.

EXAMPLE II

The composition described in Example I was applied to a set of the test bodies illustrated in the drawing. Each set of these bodies consists of a disc 1, 1″ in diameter and 5/16″ thick, and a rod 2, 1″ long and 7/16″ in diameter. In testing the composition one face of the disc 1 and one end of the rod 2 were coated with the composition as at 3 and 4. The bodies were then fired and cooled in a reducing atmosphere. After cooling, the coated surfaces were soldered together using a soft solder consisting of 50% tin and 50% lead. The disc was then clamped in a support 5 and a load applied to the rod perpendicular to the axes of the disc and the rod at a point ¾ of an inch from the soldered surfaces. The load required for fracture of the bond was measured and the modulus of rupture was calculated according to the equation $$S = \frac{32PL}{\pi d^3}$$

where:

$\Biggl\{\begin{array}{l} S \text{ is the modulus of rupture (lbs. per sq. inch)} \\ P \text{ is the breaking force (pounds)} \\ L \text{ is the distance in inches between the metallized face of the disc and the point at which the force } P \text{ is applied, and} \\ d \text{ is the diameter of the rod (inches)} \end{array}$ The modulus of rupture for the composition described in Example I was 11,700 p.s.i. By comparison, the modulus of rupture for the same compositions, in which however, the manganese dioxide was introduced as a separate ingredient rather than being melted in with the glass, was found to be 9350 p.s.i.

EXAMPLES III TO IX

A glass frit composition was prepared from a glass having the composition listed in column "A" in Table I above and a manganese substance. The procedure of Example I above was used, i.e. the glass was melted and the manganese ingredient was dissolved therein. The resulting mixture was then poured into water and the particles obtained were ground in a ball mill to a particle size between about 1 and about 8 microns. The ingredients and relative portions thereof are listed in Table II below:

*Table II*
FRIT COMPOSITIONS

|  | Examples | | | | | | |
| --- | --- | --- | --- | --- | --- | --- | --- |
|  | III | IV | V | VI | VII | VIII | IX |
| Parts glass "A" | 25 | 75 | 25 | 80 | 66.7 | 33.3 | 33.3 |
| Parts MnO₂ | 75 | 25 |  |  |  |  |  |
| Parts Mn |  |  | 75 | 20 | 33.3 | 66.7 | 66.7 |

Powdered heavy metal was then added to the manganese frit. In Examples V through IX powdered refractory metal was added. The resulting compositions and their various proportions are given in Table III below:

*Table III*

|  | Examples | | | | | | |
| --- | --- | --- | --- | --- | --- | --- | --- |
|  | III | IV | V | VI | VII | VIII | IX |
| Parts frit | 40 | 40 | 20 | 25 | 15 | 30 | 30 |
| Parts Mo |  |  |  |  |  | 30 | 15 |
| Parts W |  |  | 5 | 25 | 5 |  |  |
| Parts Co |  | 60 |  |  | 80 | 40 |  |
| Parts Ni | 60 |  | 75 | 50 |  |  | 55 |

The powdered compositions of Table III above, having a particle size between about 1 and 8 microns were then added to a liquid mixture consisting of 1.56 parts cellulose nitrate (Parlodion) dissolved in 54.69 parts of amyl acetate. The mixture was ball-milled for about 24 hours until the solids were thoroughly dispersed. Non-metallic (87% alumina) test bodies of the type described above in Example II were then dipped in the suspension, drained and fired in a protective atmosphere consisting of 25% hydrogen and 75% nitrogen. The temperature at which the particular bodies were fired is shown in Table IV below. In firing, the bodies were heated over a period of about 30 minutes and were then soaked at peak temperature for about 30 minutes. The test bodies were joined with soft solder as described above in Example II and the moduli of rupture were obtained in accordance with the procedure of Example II. The results are shown in Table IV.

EXAMPLES IIIa–IXa

These examples were carried out to provide a comparison with Examples III–IX and to show the effect of firing the manganese ingredient into the glass. In Examples IIIa–IXa the manganese ingredient was simply mixed with the non-molten glass without any preliminary firing and all the other metal ingredients were then added to form composite powders having the same oxide compositions as Examples III–IX. The powders were then mixed with cellulose nitrate dissolved in amyl acetate in the same manner as Examples III–IX and the mixtures used to coat the test bodies in the same manner described above in connection with Examples III–IX. The bodies were fired at the same temperatures and were tested for modulus of rupture. The comparison between Examples III–IX and IIIa–IXa is given in Table IV below.

*Table IV*
METALLIZED COATING BOND STRENGTH

| Examples | Modulus of Rupture | Firing Temp., °F. |
| --- | --- | --- |
| III | 7,468 | 1,950 |
| IIIa | 6,542 | 1,950 |
| IV | 9,354 | 1,750 |
| IVa | 7,740 | 1,750 |
| V | 7,643 | 1,850 |
| Va | 5,092 | 1,850 |
| VI | 11,312 | 1,750 |
| VIa | 10,185 | 1,750 |
| VII | 8,045 | 1,850 |
| VIIa | 6,927 | 1,850 |
| VIII | 8,456 | 1,950 |
| VIIIa | 7,434 | 1,950 |
| IX | 8,150 | 1,750 |
| IXa | 7,276 | 1,750 |

Table IV above graphically illustrates the improved bond strength obtained when the manganese ingredient is fired into the glass prior to the addition of heavy metal. In all of the examples shown, the increase in bond strength obtained by the process of this invention was greater than 10%, and in Example V the increase in bond strength was about 50%. This illustrates the value of this invention where high bond strengths are desired.

What is claimed is:
1. A method for preparing coating compositions for use in applying metallic coatings to refractory non-metallic bodies, said compositions comprising a vehicle capable of being substantially completely vaporized at a temperature in the range between about 1300° F. and about 2400° F., a manganese component, a silica-containing glass which is capable of forming a flux with said manganese component at a temperature between about 1300° F. and about 2400° F., and a principal metallic component selected from the group consisting of the heavy metals nickel, cobalt and iron, mixtures of said heavy metals, and mixtures of at least one of said heavy metals with at least one of the refractory metals molybdenum and tungsten, said method comprising forming a molten mixture of said manganese component and said glass, cooling said mixture to form a frit, reducing said frit to finely divided form, and mixing said finely divided frit with said principal metallic component in finely divided form and said vehicle.

2. A method for applying a metallic coating to a refractory non-metallic body which comprises forming a molten mixture of a manganese component and a silica-containing glass which is capable of forming a flux with said manganese component at a temperature between about 1300° F. and about 2400° F., cooling said mixture to form a frit, reducing said frit to finely divided form, mixing said finely divided frit with a metallic component selected from the group consisting of the heavy metals nickel, cobalt and iron, mixtures of said heavy metals and mixtures of at least one of said heavy metals and at least one of the refractory metals molybdenum and tungsten, applying the mixture last described to the body to be coated and firing the body with the mixture applied, to a temperature between about 1300° F. and about 2400° F.

3. The method claimed in claim 1 wherein the metallic component consists essentially of a heavy metal, and constitutes between about 60 and about 95% by weight of the metallic-glass base.

4. The method claimed in claim 1 wherein the metallic component is a mixture of a heavy metal and a refractory metal and wherein said heavy metal constitutes between about 40 and about 85% by weight of the metallic-glass base and the refractory metal between about 5 and about 30% by weight of the metallic-glass base, the total metallic component constituting not more than about 95% by weight of the metallic-glass base.

5. The method claimed in claim 2 wherein said manganese containing glass contains between about 0.5 and about 25%, on the weight of the metallic-glass base, of manganese.

6. The method claimed in claim 2 wherein the metallic component consists essentially of a heavy metal, and constitutes between about 60 and about 95% by weight of the metallic-glass base.

7. The method claimed in claim 2 wherein the metallic component is a mixture of a heavy metal and a refractory metal and wherein said heavy metal constitutes between about 40 and about 85% by weight of the metallic-glass base and the refractory metal between about 5 and about 30% by weight of the metallic-glass base, the total metallic component constituting not more than about 95% by weight of the metallic-glass base.

References Cited in the file of this patent

UNITED STATES PATENTS

| | | |
|---|---|---|
| 2,711,975 | Wainer et al. | June 28, 1955 |
| 2,753,271 | Treptow | July 3, 1956 |
| 2,795,506 | Sweo et al. | June 11, 1957 |
| 2,837,487 | Huttar | June 3, 1958 |
| 2,857,664 | Luks et al. | Oct. 28, 1958 |